(12) United States Patent
Ohtani

(10) Patent No.: US 8,281,038 B2
(45) Date of Patent: Oct. 2, 2012

(54) THIN CLIENT TERMINAL, OPERATION PROGRAM AND METHOD THEREOF, AND THIN CLIENT SYSTEM

(75) Inventor: Takeshi Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 486 days.

(21) Appl. No.: 12/503,473

(22) Filed: Jul. 15, 2009

(65) Prior Publication Data
US 2009/0276524 A1 Nov. 5, 2009

Related U.S. Application Data

(63) Continuation of application No. PCT/JP2007/055482, filed on Mar. 19, 2007.

(51) Int. Cl.
G06F 15/16 (2006.01)
G06F 15/173 (2006.01)
G06F 15/177 (2006.01)
(52) U.S. Cl. ......... 709/250; 709/203; 709/220; 709/223
(58) Field of Classification Search .................. 709/203, 709/220–226, 250; 713/1–2
See application file for complete search history.

(56) References Cited

U.S. PATENT DOCUMENTS

| 7,493,487 | B2 | 2/2009 | Phillips | 713/168 |
| 7,631,173 | B2* | 12/2009 | Fausak | 713/1 |
| 2004/0010795 | A1 | 1/2004 | Sasaki | 719/321 |
| 2004/0158699 | A1* | 8/2004 | Rhoads et al. | 713/1 |
| 2005/0149204 | A1 | 7/2005 | Manchester | 700/1 |
| 2005/0149626 | A1 | 7/2005 | Manchester | 709/220 |
| 2005/0149732 | A1 | 7/2005 | Freeman | 713/171 |
| 2005/0149757 | A1 | 7/2005 | Corbett | 713/201 |
| 2005/0198221 | A1 | 9/2005 | Manchester | 709/220 |
| 2005/0198233 | A1 | 9/2005 | Manchester | 709/221 |
| 2006/0242395 | A1* | 10/2006 | Fausak | 713/1 |
| 2007/0226518 | A1 | 9/2007 | Yasaki | 713/189 |

FOREIGN PATENT DOCUMENTS

| JP | 2004-46587 | 2/2004 |
| JP | 2004-78849 | 3/2004 |
| JP | 2004-246720 | 9/2004 |
| JP | 2005-10957 | 1/2005 |
| JP | 2005-216292 | 8/2005 |

(Continued)

OTHER PUBLICATIONS

Taketa, T. et al., *Centralized Management System of Client PCs Using Bootserver*, FIT 2006 (5th Forum on Information Technology), Aug. 21, 2006, pp. 81-82.

(Continued)

Primary Examiner — Joshua Joo
(74) Attorney, Agent, or Firm — Staas & Halsey LLP

(57) ABSTRACT

A thin client terminal 1 that can be connected to a thin client operation management server 3 includes: a memory 12 capable of storing system data for mobile environment used when the thin client terminal 1 is not connected to the thin client operation management server 3; and a controller generation section 13c that acquires the system data for non-mobile environment and uses the system data for non-mobile environment to generate a thin client controller 11a, generates a driver 11c capable of accessing the memory 12 by the operation of the thin client controller 11a, and uses the driver 11c to write the system data for mobile environment acquired from the thin client operation management server 3 in the memory 12.

13 Claims, 17 Drawing Sheets

FOREIGN PATENT DOCUMENTS

| | | |
|---|---|---|
| JP | 2006-114048 | 4/2006 |
| JP | 2006-154987 | 6/2006 |
| JP | 2007-257197 | 10/2007 |

OTHER PUBLICATIONS

Japanese Laid-Open Patent Publication No. 2006-114048, Apr. 27, 2006.

Japanese Laid-Open Patent Publication No. 2005-216292, Aug. 11, 2005.

Japanese Laid-Open Patent Publication No. 2007-257197, Oct. 4, 2007.

English Translation of the International Preliminary Report on Patentability, issued Sep. 22, 2009 in corresponding International Patent Application PCT/JP2007/055482.

* cited by examiner

INITIAL STATE
(BEFORE POWER-ON)

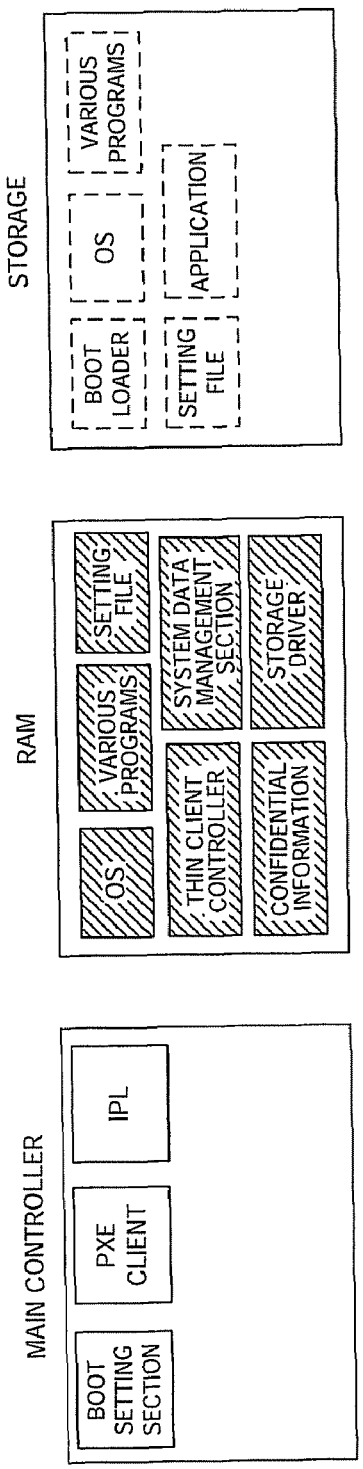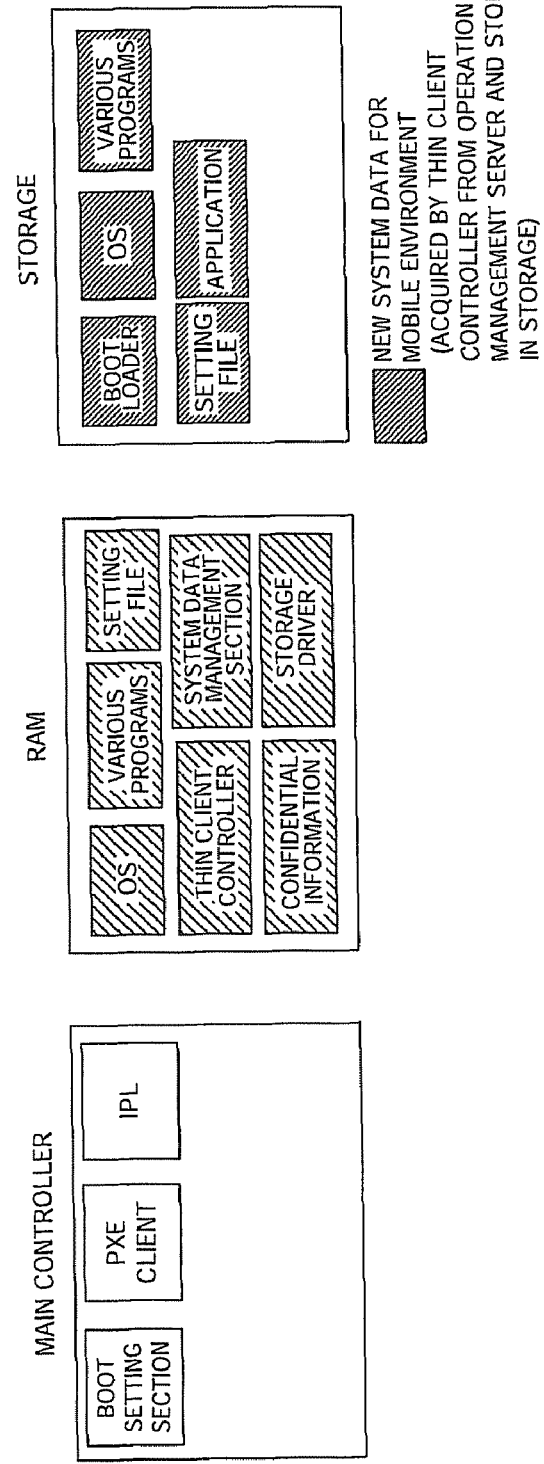

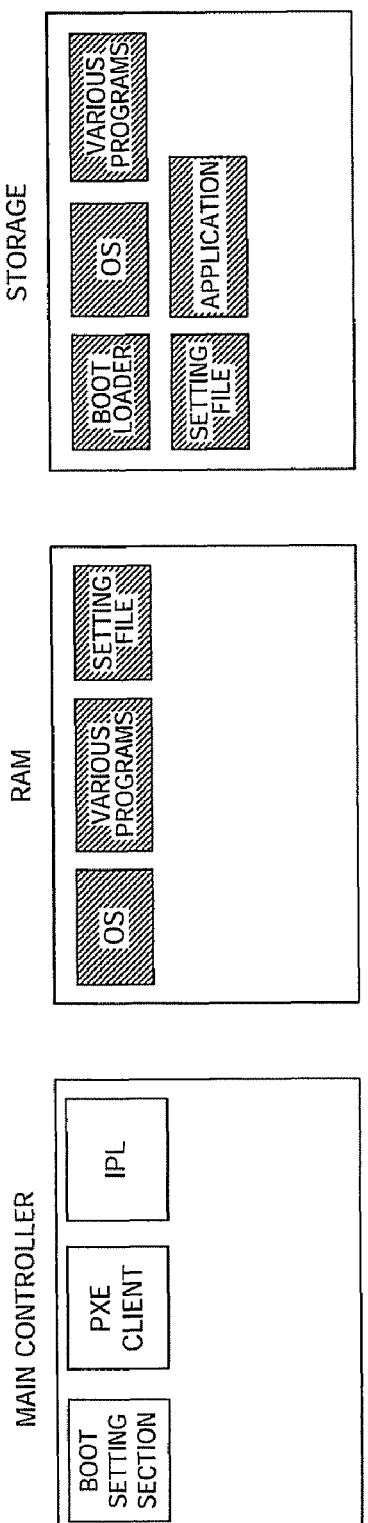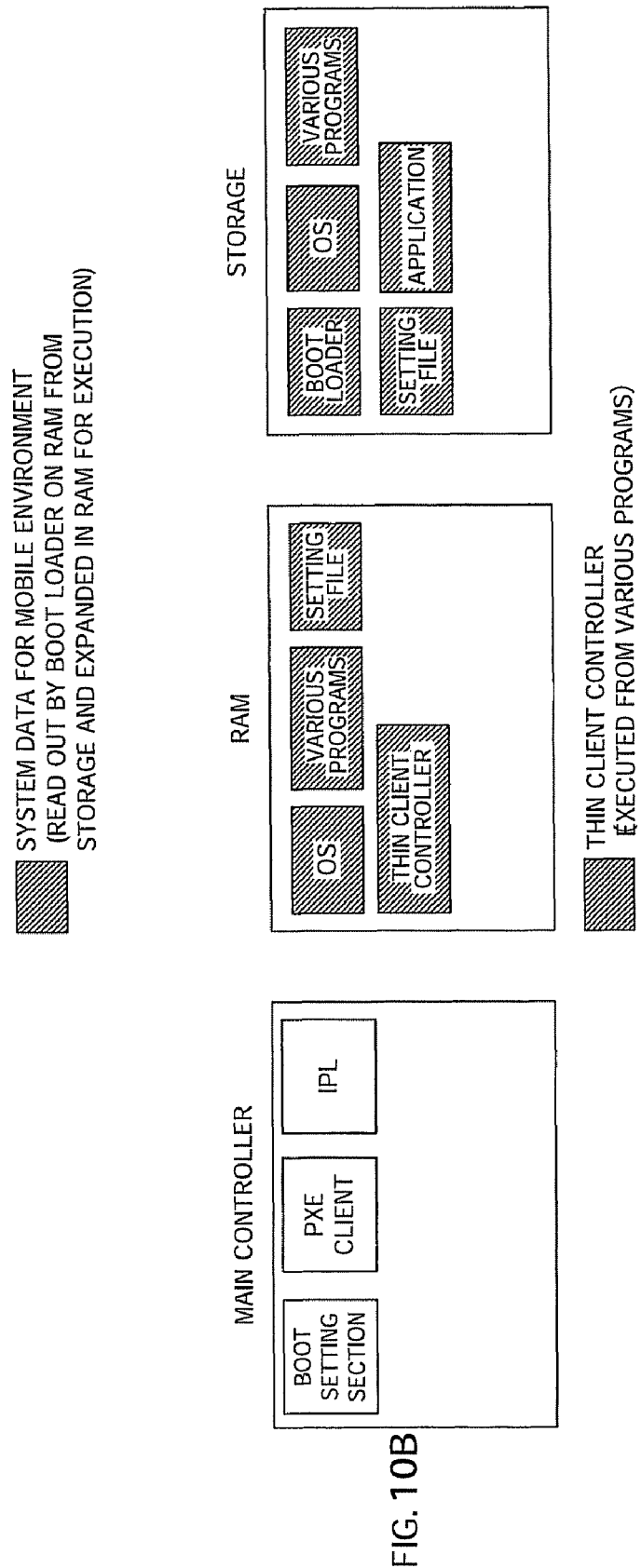
FIG. 10A
FIG. 10B

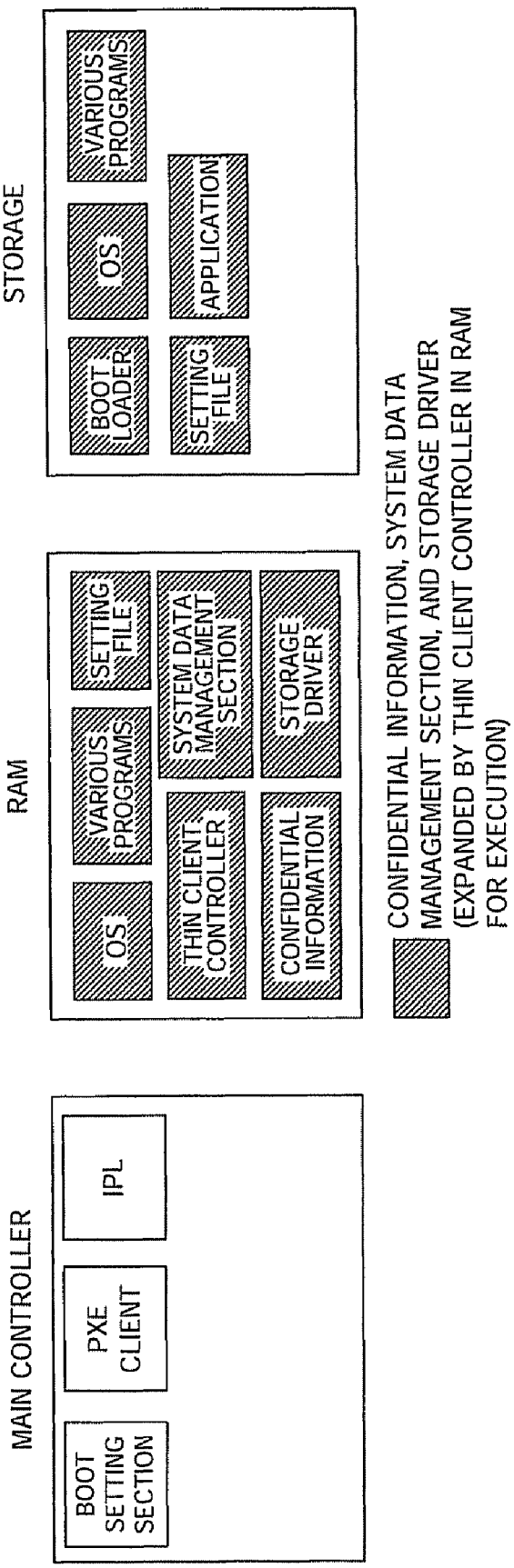

FIG. 14

| IP ADDRESS | STATE | STATE UPDATED DATE | DATA UPDATE STATE | UPDATE EXECUTION DATE |
|---|---|---|---|---|
| 133.152.1.1 | open | 2006-09-23T01:01:47Z | done | 2006-09-23T02:03:58Z |
| 133.152.1.2 | closed | 2006-09-23T02:02:47Z | undone | — |
| 133.152.1.3 | open | 2006-09-23T03:03:47Z | undone | — |
| ~ | ~ | ~ | ~ | ~ |

THIN CLIENT TERMINAL, OPERATION PROGRAM AND METHOD THEREOF, AND THIN CLIENT SYSTEM

CROSS-REFERENCE TO RELATED APPLICATIONS

This application is a continuation application, filed under 35 U.S.C. §111(a), of PCT Application No. PCT/JP2007/055482, filed Mar. 19, 2007, the disclosure of which is herein incorporated in its entirety by reference.

FIELD

The present invention relates to a thin client terminal, an operation program and method thereof, and a thin client system capable of simultaneously achieving a reduction in operation management cost and an improvement in security.

BACKGROUND

A thin client system has attracted attention in recent years because of heightened sense of crisis concerning information leakage and growing concerns about importance of a reduction in cost involved in management of a business system.

A terminal device used in a thin client system, i.e., a thin client terminal is a terminal device provided only with minimum required functions (e.g., OS with limited functions, screen transfer application, BIOS (Basic Input/output System)) and is configured to utilize applications and business data stored in a server. Thus, the thin client terminal does not have a storage such as an HDD (Hard Disk Drive). If the thin client terminal has a storage, data created by a user, such as business data, is not at all stored in the storage.

Therefore, even if the thin client terminal has been stolen, information is not leaked outside from the stolen thin client terminal. Further, an OS or applications that the thin client terminals use can be managed on the server side, allowing setting for the thin client terminals to be collectively made. Accordingly, it is possible to promptly apply a patch to the OS or application in the individual thin clients, allowing an administrator to perform effective management for operation of the terminal devices.

There exist several types of thin client systems. For example, there is known a network boot thin client system in which a thin client terminal downloads an OS or application from a server and executes the downloaded OS or application on the terminal.

Hereinafter, with reference to FIG. 17, the network boot thin client system will be described.

A thin client terminal 1A which is a terminal device having no storage accesses, at its start-up time, an operation management server 3A that manages operation of the thin client terminal through a network 2. Then, the thin client terminal 1A downloads OS data required for the terminal 1A to operate from the operation management server 3A and boots it. After that, when executing an application, the thin client terminal 1A downloads the application and a library required for the execution of the application from the operation management server 3A.

The network boot thin client system is advantageous in the following points: it involves low facility cost; it exhibits excellent performance at the execution time of a job; and it provides easy access to peripheral devices.

However, the thin client terminal cannot be booted in a mobile environment that the thin client terminal is not connected to a network at its power-on time.

Even if a thin client terminal 1B in the mobile time uses a public network 4 with a narrow bandwidth to access a network and can be booted, it is necessary for the thin client terminal 1B to download an application and a large number of libraries required for execution of the application from a file server before executing the application. Thus, under a situation where it is difficult to perform broadband communication, the network boot thin client system is difficult to use.

Under the circumstance, there has been proposed a technique in which an OS and an application have previously been stored in a read-only medium, such as a CD-ROM or USB-ROM and the thin client terminal boots the OS from the medium and loads an execution image of the application.

In this technique, the thin client terminal does not use a network for booting an OS having a large size or loading an application having a large size but boots the OS or executes the application from the read-only medium, allowing the thin client terminal to easily boot the OS or load the application.

Meanwhile, business data that individual users use are stored in an operation management server, and the thin client terminal uses remote access dial-up connection or wireless LAN to access the business data. Thus, the business data are not stored in the individual thin client terminal, allowing prevention of information leakage.

In this case, however, a user of the thin client terminal always needs to carry a medium storing the OS or application and, therefore, there is a possibility of damage or loss of the medium. Further, the medium needs to be created and delivered every time the OS or application is updated, increasing operation cost. Further, when a CD-ROM is used for the delivery of the OS or application, a component for driving the CD-ROM needs to be provided and, accordingly, the rate of occurrence of failure increases, resulting in an increase in maintenance cost.

In order to cope with this, a method can be considered in which the OS or execution image of the application is stored in a CF (Compact Flash) incorporated in the thin client terminal or a writable non-volatile memory device such as a USB memory and the operation management server remotely manages the thin client terminal.

However, allowing data to be written into such a medium allows a user to store important data in the thin, client terminal, causing a risk of information leakage.

There is known a technique, although it has not been designed for the network boot thin client, that realizes a mechanism in which the OS or application provided in the terminal is managed from outside the terminal. In this technique, an operation management server has its inside a simple virtual appliance. A user of a terminal cannot access (operate) the virtual appliance but only an administrator operating an external IT console can use the virtual appliance. An OS or application provided in the terminal can be updated through the IT console. However, a management function itself is provided in the terminal, there is a risk that the management function in the terminal may be falsificated.

As a prior art relating to the present invention, there is known a method for configuring network settings of a thin client using a computer-readable portable storage medium (refer to, e.g., Japanese Laid-open Patent Publication No. 2005-216292).

As described above, in the case where the thin client terminal is used in the mobile environment, when importance is attached to security against information leakage, operation management cost is increased, while when importance is attached to easiness of the operation management, a risk of the information leakage is increased.

SUMMARY

According to a aspect of the invention, a computer-readable medium having recorded thereon a thin client terminal operation program executed in a computer serving as a thin client terminal that can be connected to a thin client operation management server and has a memory capable of storing system data for mobile environment used when the thin client terminal is not connected to the thin client operation management server the program allowing a computer to a process comprising: causing a thin client controller to generate a driver capable of accessing the memory; and causing the driver generated by the thin client controller to write the system data for mobile environment acquired from the thin client operation management server in the memory, the thin client controller being generated by system data for non-mobile environment acquired from the thin client operation management server at the time when the thin client terminal is connected to the thin client operation management server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 8A and 8B are third views showing a state of data provided in the thin client terminal when the thin client terminal is not used as a mobile one (in the non-mobile environment);

FIGS. 10A and 10B are second views showing a state of data provided in the thin client terminal when the thin client terminal is used as a mobile one (in the mobile environment);

FIG. 11 is a third view showing a state of data provided in the thin client terminal when the thin client terminal is used as a mobile one (in the mobile environment);

FIG. 14 is a view showing a state management table;

DESCRIPTION OF EMBODIMENTS

Embodiments of the present invention will be described below with reference to the accompanying drawings.

First Embodiment

Configurations of a thin client terminal and an operation management server according to a first embodiment of the present invention will first be described. In the present embodiment, it is assumed that the thin client terminal has a hardware configuration including at least a CPU, a ROM storing a firmware (BIOS), a RAM, and a storage.

Figure 1:
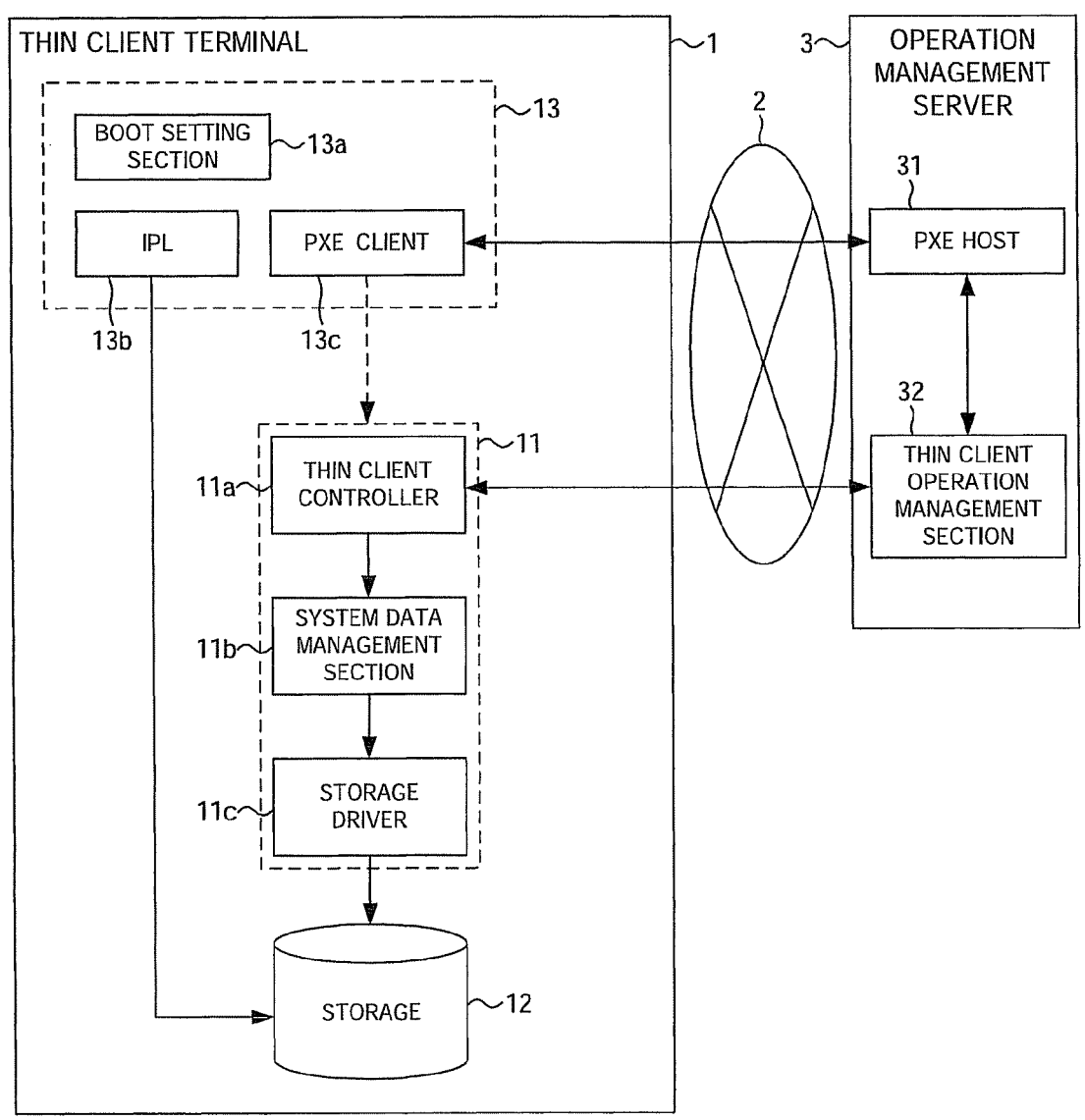
FIG. 1 is a block diagram showing the entire configuration of a first embodiment.

FIG. 1 is a configuration view showing the thin client terminal and operation management server according to the present embodiment. The entire system of the first embodiment is constituted by a thin client terminal 1, an operation management server 3, and a network 2 connecting the thin client terminal 1 and the operation management server 3. The thin client terminal 1 includes a mobile data storage management section 11, a storage 12, and a main controller 13. The mobile data storage management section 11 includes a thin client controller 11a, a system data management section 11b, and a storage driver 11c. The main controller 13 includes a boot setting section 13a, an IPL (Initial Program Loader) 13b, and a PXE (Preboot execution Environment) client 13c.

The operation management server 3 includes a PXE host 31, and a thin client operation management section 32. The thin client terminal 1 and the operation management server 3 are connected to each other through the network 2.

The thin client controller 11a acquires system data from the thin client operation management section 32 and instructs data provision in the storage 12. The system data management section 11b manages the version information of the system data stored in the storage and instructs the storage driver 11c to perform reading/writing of the system data.

The storage driver 11c receives the instruction from the system data management section 11b and accesses the storage 12. The storage 12 is preferably a non-volatile memory incorporated in the tamper-resistant thin client terminal 1.

The boot setting section 13a starts up the IPL 13b and the PXE client 13c in order of the priority set therein. The IPL 13b starts up a mobile system provided in the storage 12.

The PXE client 13c acquires an IP address and system data for non-mobile environment from the PXE host 31 through the network 2 and starts up the non-mobile system.

The PXE host 31 transmits the IP address required from the PXE client 13c through the network 2 to the PXE client 13c. The PXE host 31 acquires the system data for non-mobile environment from the thin client operation management section 32 and transmits it to the PXE client 13c.

The thin client operation management section 32 transmits to the thin client controller 11a system data for mobile environment required from the thin client controller 11a through the network 2. The thin client operation management section 32 also retains the system data for non-mobile environment and passes the system data for non-mobile environment to the PXE host 31 according to a request from the PXE host 31.

Unlike the system data for non-mobile environment, the system data for mobile environment is customized system data and differs from the system data for non-mobile environment in terms of a driver to be installed, application, and setting information. For example, the storage driver 11c of the system data for mobile environment may be write-protected, or an application for remote access may be included in the system data for mobile environment. Further, an OS to be used may differ between the mobile and non-mobile environments.

Figure 2:
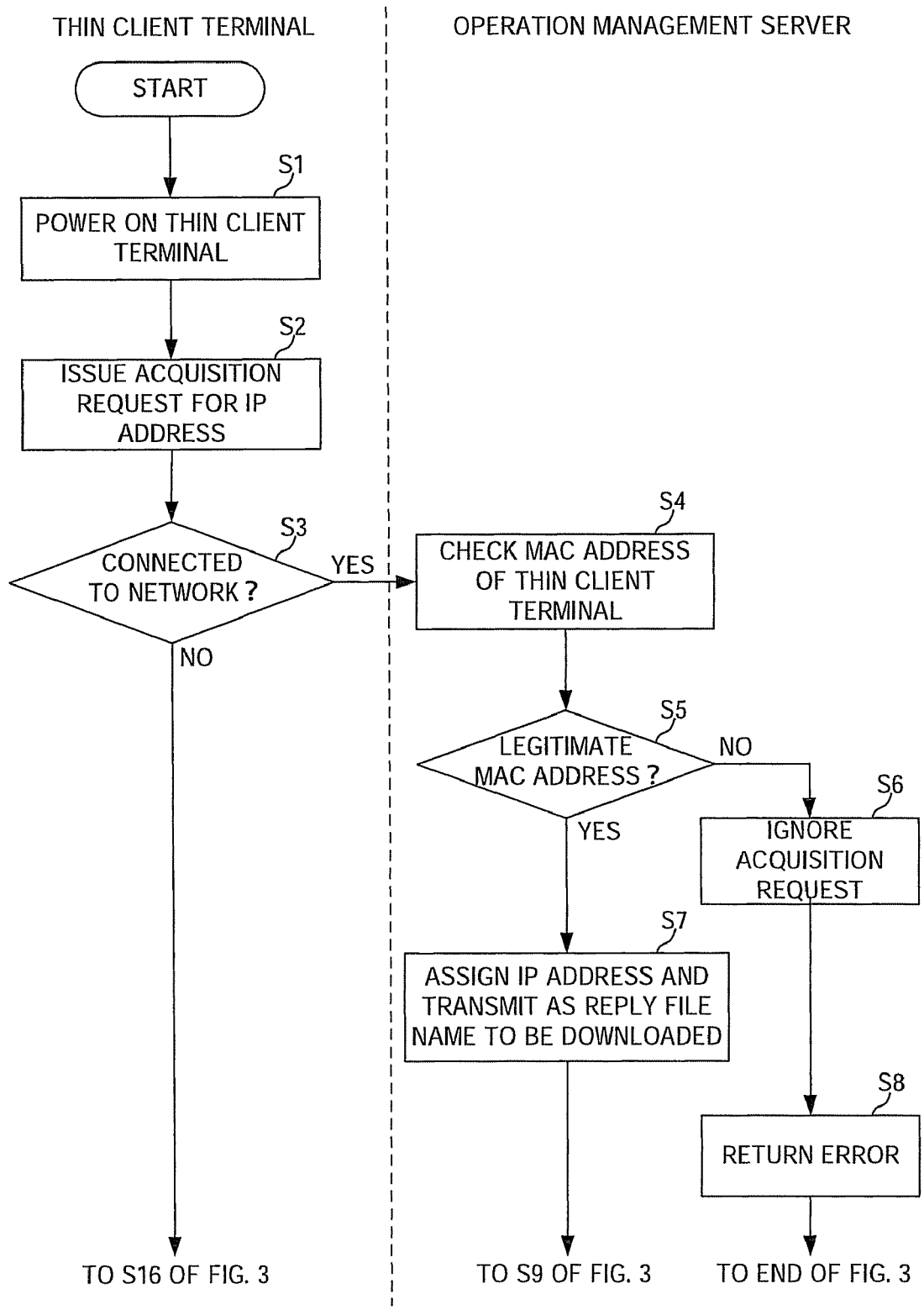
FIG. 2 is a first flowchart showing operation of the first embodiment.
Figure 3:
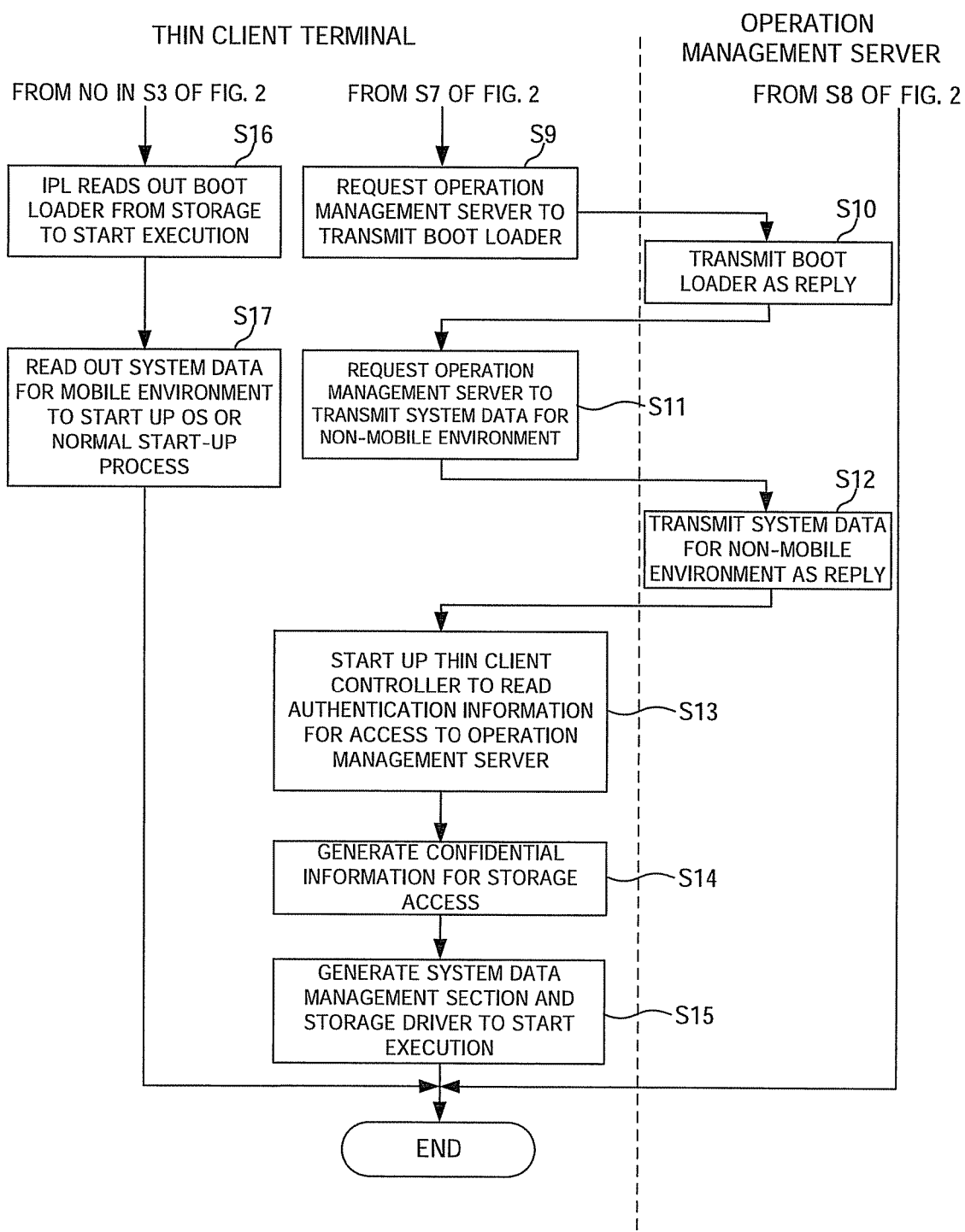
FIG. 3 is a second flowchart showing the operation of the first embodiment.

FIGS. 2 and 3 are first and second flowcharts showing the entire operation of the first embodiment of the present invention. These flowcharts show an example of operation in the non-mobile environment where the thin client terminal 1 is utilized in a state where it is connected to the operation management server 3 through the network 2 and in the mobile environment where the thin client terminal 1 is utilized in a state where it is not connected to the operation management server 3.

When the thin client terminal 1 is powered on (S1), the boot setting section 13a starts up the PXE client 13c in order of the priority of boot media and requests the PXE host 31 to assign an IP address thereto (S2). Note that, in the priority setting of the boot media, the highest priority is given to the network.

When the thin client terminal 1 is not connected to the network 2 (No in S3), the PXE client 13c cannot acquire an IP address and thus fails in execution of the network boot. Accordingly, in order of the priority, the boot setting section 13a causes the IPL 13b to read out a boot loader from the storage 12 (S16). The read out boot loader then reads out the system data for mobile environment, starts up the OS, and executes a resident program (S17).

When the thin client terminal 1 is connected to the network 2 (YES in S3), the PXE host 31 receives the request from the PXE client 13c and checks a MAC (Media Access Control) address of the thin client terminal 1 (S4) to confirm whether the MAC address is a MAC address of a legitimate (connection-permitted) thin client terminal 1 (S5).

When the PXE host 31 checks the MAC address and determines that the thin client terminal 1 is not legitimate (NO in S5), it ignores the request from the PXE client 13c (S6) but returns an error to the PXE client 13c (S8) to end this flow.

On the other hand, when the PXE host 31 determines that the thin client terminal 1 is legitimate (YES in S5), it assigns an IP address to the thin client terminal 1 and, at the same time, transmits the boot loader and a file name of the system data for non-mobile environment to the PXE client 13c (S7). The PXE client 13c that has acquired an IP address then requests the PXE host 31 to transmit thereto the boot loader (S9). The PXE host 31 acquires the boot loader from the thin client operation management section 32 and transmits it to the PXE client 13c (S10). The PXE client 13c that has acquired the boot loader then uses the boot loader to request the PXE host 31 to transmit the system data for non-mobile environment thereto (S11). The PXE host 31 acquires the system data for non-mobile environment from the thin client operation management section 32 and transmits it to the PXE client 13c (S12).

The PXE client 13c that has acquired the system data for non-mobile environment then uses the boot loader to start up the OS. The OS starts executing a resident program and starts up the thin client controller 11a to read authentication information (ID, password, or certificate) for the operation management server and IP address in the RAM (S13) and generate confidential information for storage access (S14). Then, the thin client controller 11a generates the system data management section 11b and storage driver 11c which are child processes that only the thin client controller 11a can generate (S15).

The above confidential information (random numbers or secret key) is retained in the RAM. The confidential information is used for the storage driver 11c to authenticate the system data management section 11b. The system data management section 11b and the storage driver 11c are generated using the confidential information as a parameter.

The system data management section 11b uses a proprietary API (Application Programming Interface) to utilize the storage driver 11c and presents its confidential information for write access to the storage.

Thus, even if a given user tries to write to the storage not through the system data management section 11b, the user uses a common I/O API having no confidential information for access, so authentication is not carried out to disable writing to the storage 12. Further, even if a given user can create a program for utilizing the proprietary API, he cannot acquire the confidential information since it is retained only in the RAM, resulting in failure to acquire write access to the storage.

The method of determining whether the thin client terminal 1 is in the mobile environment or not in the present embodiment is merely an example, and the determination may be made by checking whether a wired or wireless connection is being used or by using a sensor or the like.

Figure 4:
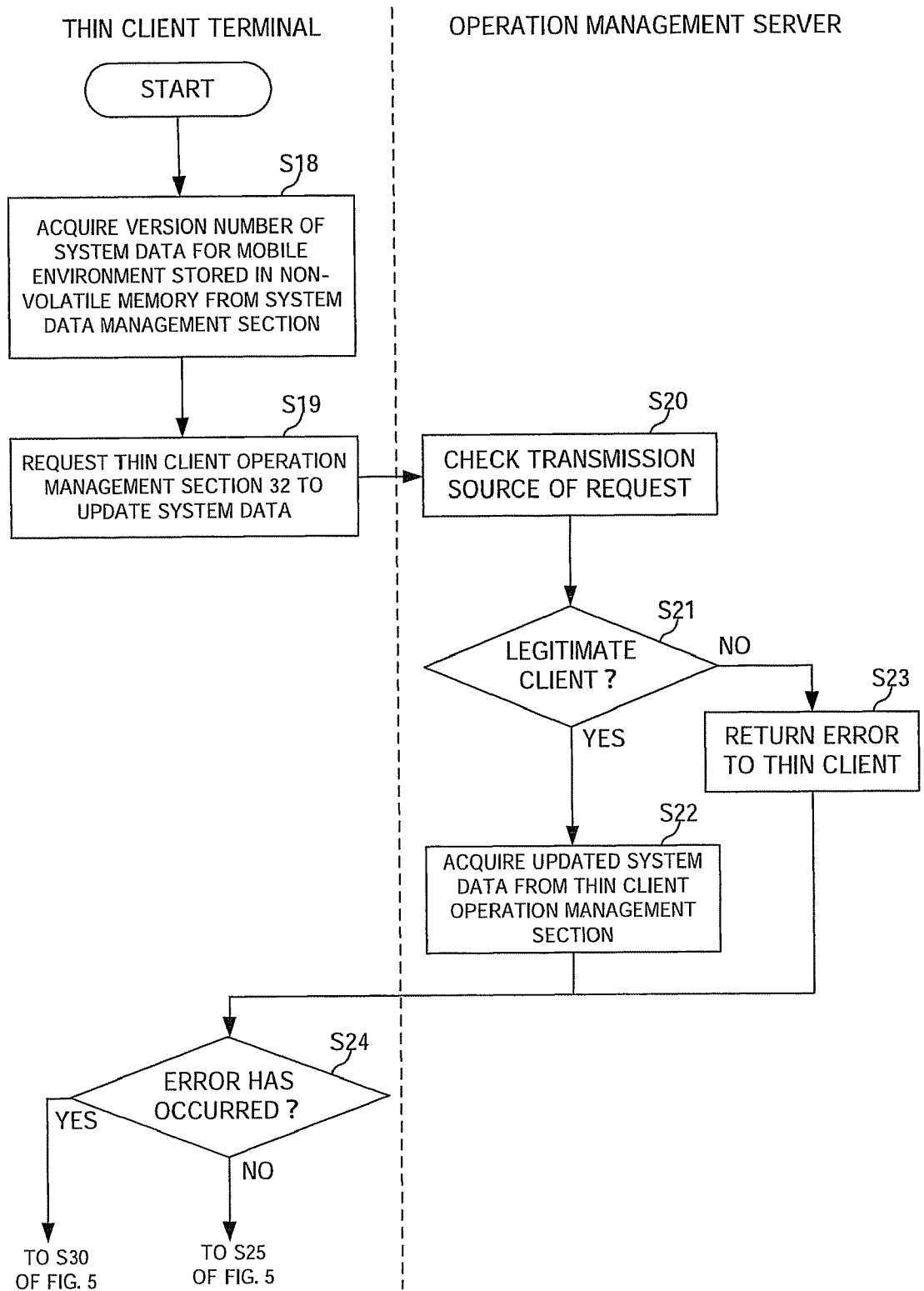
FIG. 4 is a first flowchart showing system data update processing.
Figure 5:
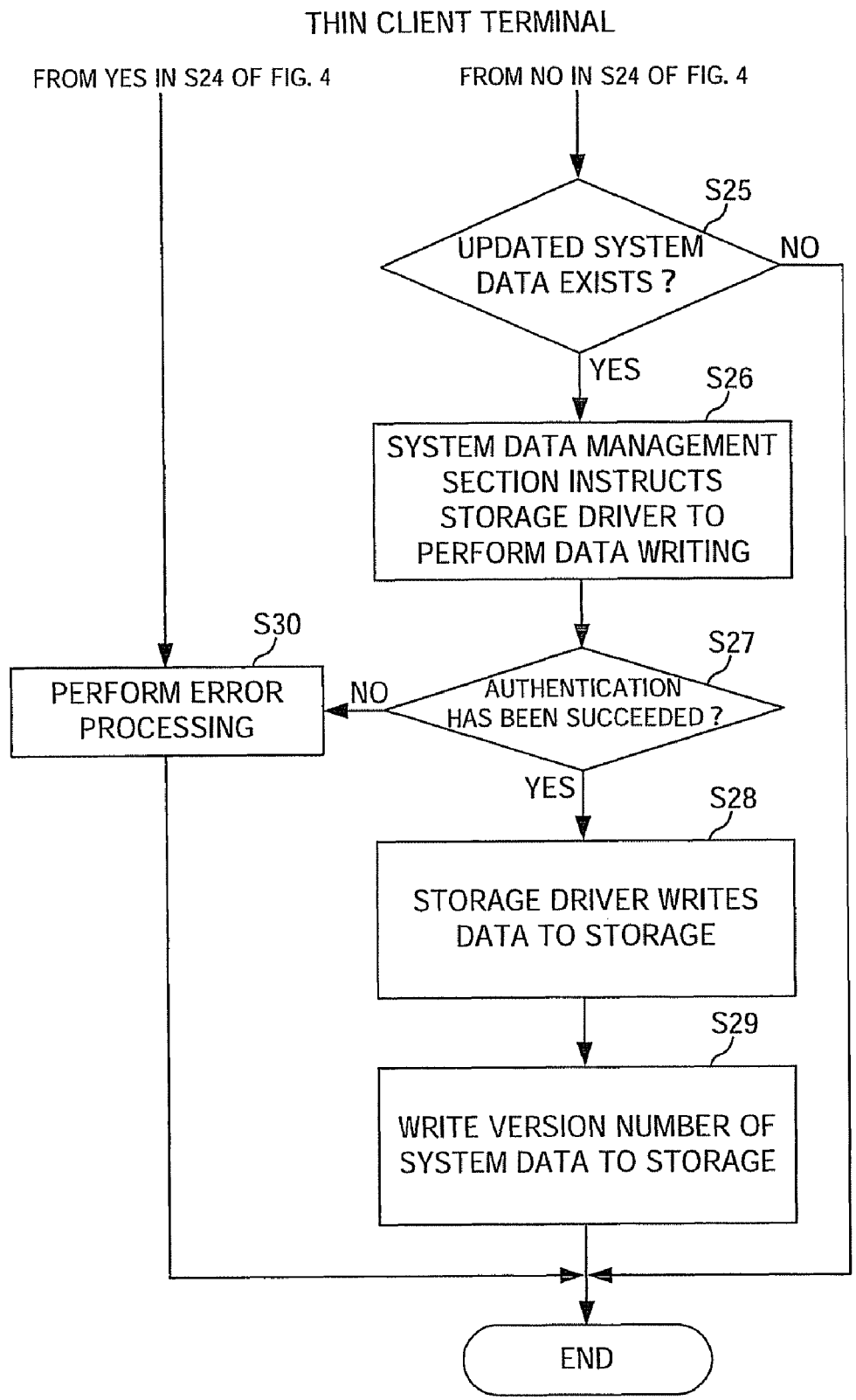
FIG. 5 is a second flowchart showing the system data update processing.

FIGS. 4 and 5 are flowcharts showing system data for mobile environment update processing at the time of use of the non-mobile system.

The thin client controller 11a acquires the version number of the system data for mobile environment stored in the storage 12 from the system data management section 11b (S18) and transmits the acquired version number to the thin client operation management section 32 so as to request the system data for mobile environment (S19).

The thin client operation management section 32 checks the transmission source of the request (S20) so as to determine that the thin client terminal 1 is a legitimate client based on the authentication information for operation management server that the thin client terminal 1 has (S21). When the thin client operation management section 32 determines that the thin client terminal 1 is a legitimate client (YES in S21) and system data for mobile environment newer than the system data for mobile environment stored in the storage 12 of the thin client terminal 1 exists in the thin client operation management section 32, the thin client operation management section 32 transmits the newer system data for mobile environment to the thin client controller 11a (S22). Note that the determination in S21 constitutes an authentication section of the present invention.

On the other hand, when the thin client operation management section 32 determines that the thin client terminal 1 is not a legitimate client (NO in S21), the thin client operation management section 32 returns an error to the thin client terminal 1 (S23).

The thin client controller 11a determines whether an error has occurred in the system data for mobile environment update request (S24). When determining that the error has occurred (YES in S24), the thin client controller 11a performs error processing (S30) and then ends the system data for mobile environment update processing.

On the other hand, when determining that the error has not occurred (NO in S24), the thin client controller 11a determines whether the newer system data for mobile environment has been acquired from the thin client operation management section 32 (S25).

When the newer system data for mobile environment has not been acquired (NO in S25), the thin client controller 11a ends the system data for mobile environment update processing. On the other hand, when the newer system data for mobile environment has been acquired (YES in S25), the system data management section 11b acquires the newer system data for mobile environment from the thin client controller 11a and instructs the storage driver 11c to write the system data for mobile environment to the storage 12. At this time, the system data management section 11b presents the confidential information to the storage driver 11c (S26).

The storage driver 11c checks whether the confidential information presented by the system data management section 11b coincides with confidential information at the start-up time (S27). When the confidential information presented by the system data management section 11b does not coincide with confidential information at the start-up time (NO in S27), the storage driver 11c performs error processing (S30). The storage driver 11c writes the system data for mobile environment to the storage 12 only when both the confidential information coincide with each other (YES in S27) (S28). At this time, the storage driver 11c also writes the version number of the system data for mobile environment (S29) and then ends the system data for mobile environment update processing.

The system data management section 11b does not directly expand the system data for mobile environment in a predetermined file system provided in the storage 12 but expands the system data once in a temporary area and then moves it to the file system so as to allow the thin client terminal 1 to continue operating even if an unexpected system halt occurs. Further, the system data management section 11b inspects the system data for mobile environment in the storage 12 to see if the system data for mobile environment has been corrupted or not. In this case, when there is any problem, the thin client terminal 1 may display a message warning a user not to stop the thin client terminal 1 and instruct the user to acquire the system data.

FIGS. 6A, 6B, 7A, 7B, 8A, and 8B each show a state of data provided in the main controller, RAM, and storage of the thin client terminal 1 in the non-mobile environment. These drawings except FIG. 8B also show a state indicating whether old version system data for mobile environment exists in the storage 12.

Figure 6A:
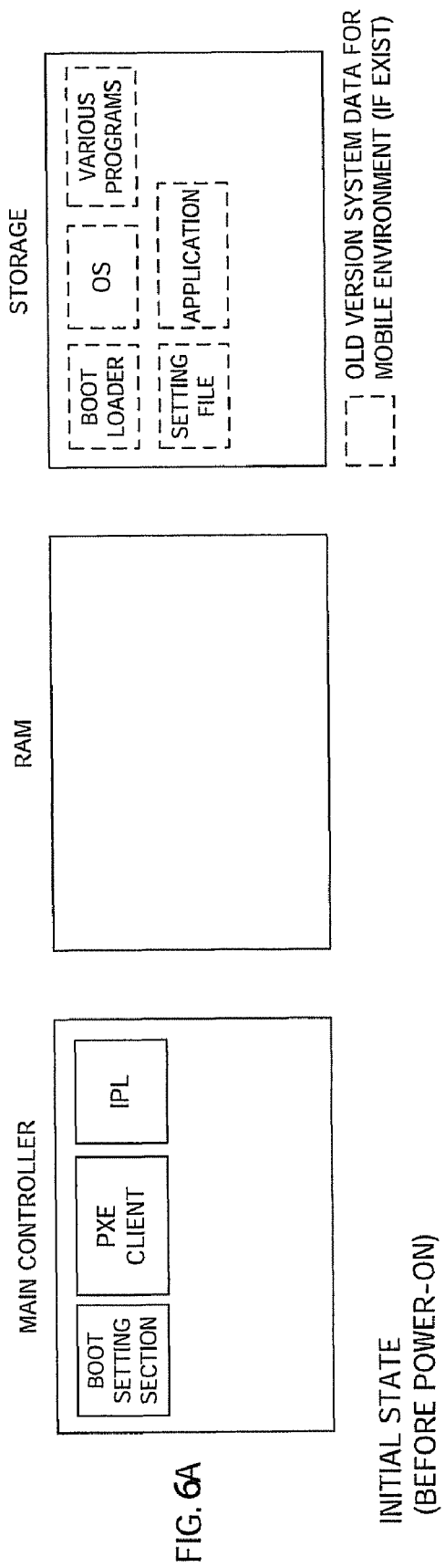
FIGS. 6A and 6B are first views showing a state of data provided in the thin client terminal when the thin client terminal is not used as a mobile one (in the non-mobile environment)
Figure 6B:
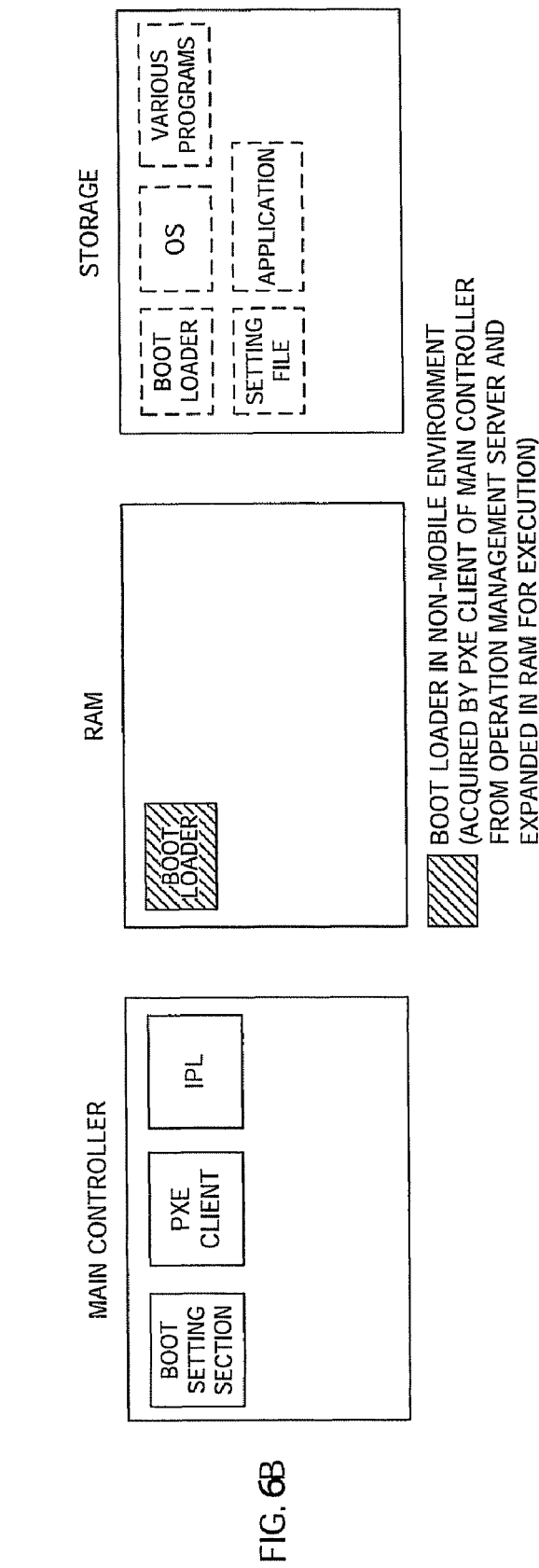

After power-on of the thin client terminal 1, the boot setting section 13a in the main controller 13 starts up the PXE client 13c in order of the priority <FIG. 6A>, and the PXE client 13c acquires the boot loader from the operation management server and expands the boot loader in the RAM so as to execute it <FIG. 6B>.

Figure 7A:
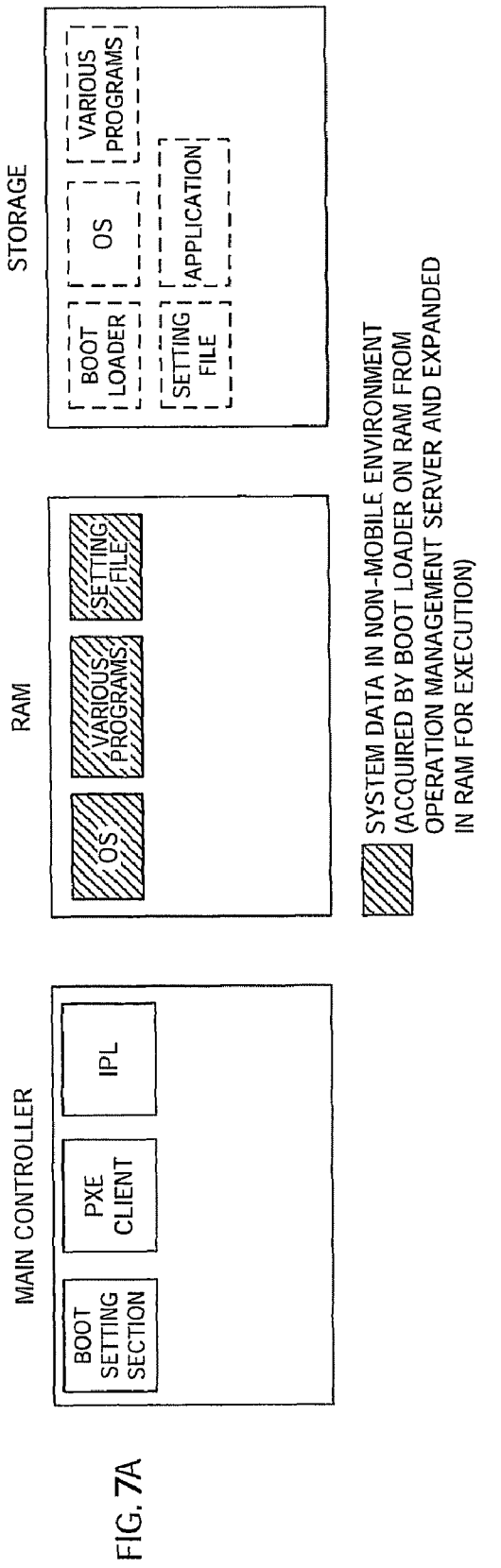
FIGS. 7A and 7B are second views showing a state of data provided in the thin client terminal when the thin client terminal is not used as a mobile one (in the non-mobile environment)
Figure 7B:
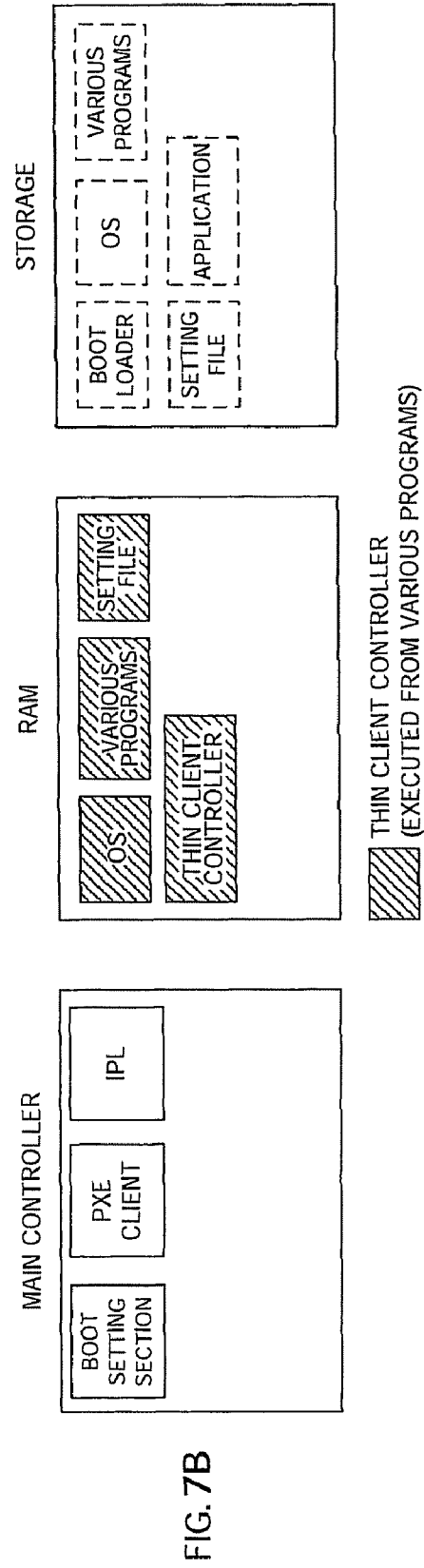

The boot loader on the RAM acquires the system data for non-mobile environment from the operation management server and expands the acquired system data for non-mobile environment in the RAM so as to start executing it <FIG. 7A>. Then, among various programs, the thin client controller 11a is started up <FIG. 7B>. The thin client controller 11a then expands the confidential information, the system data management section 11b, and the storage driver 11c in the RAM for execution of respective processing <FIG. 8A>. After that, the thin client control section 11a acquires the latest system data for mobile environment from the operation management server 3 and stores it in the storage 12 <FIG. 8B>.

FIGS. 9A, 9B, 10A, 10B, and 11 each show a state of data provided in the thin client terminal 1 in the mobile environment. These drawings also show a state where the latest system data for mobile environment exists in the storage 12 in the non-mobile environment.

Figures 9A, 9B:
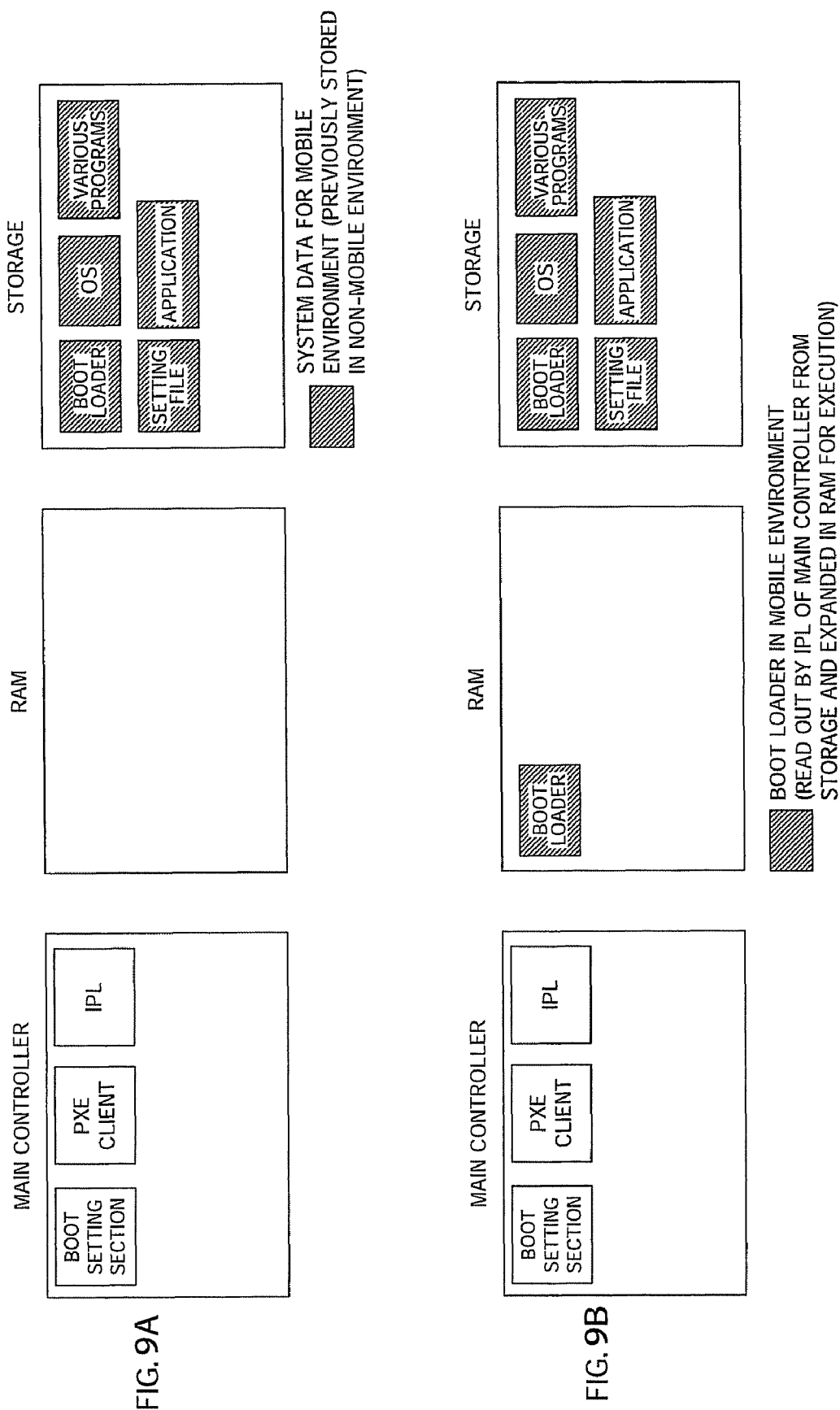
FIGS. 9A and 9B are first views showing a state of data provided in the thin client terminal when the thin client terminal is used as a mobile one (in the mobile environment)

After power-on of the thin client terminal 1, the boot setting section 13a in the main controller 13 starts up the IPL 13b in order of the priority <FIG. 9A>, and the IPL 13b reads out the boot loader from the storage 12 and expands the boot loader in the RAM so as to execute it <FIG. 9B>. The boot loader on the RAM acquires the system data for mobile environment from the storage 12 and expands the acquired system data for mobile environment in the RAM so as to start executing it <FIG. 10A>. Then, among various programs, the thin client controller 11a is started up <FIG. 10B>. The thin client controller 11a then expands the confidential information, the system data management section 11b, and the storage driver 11c in the RAM for execution of respective processing <FIG. 11>.

Second Embodiment

While the first embodiment assumes a case where the thin client controller 11a updates the system data for mobile environment, the system data for mobile environment may be updated during a time period when a user infrequently access the thin client terminal 1. With this configuration, the update of the system data for mobile environment is carried out in the background, so that user's work is not interrupted.

Figure 12:
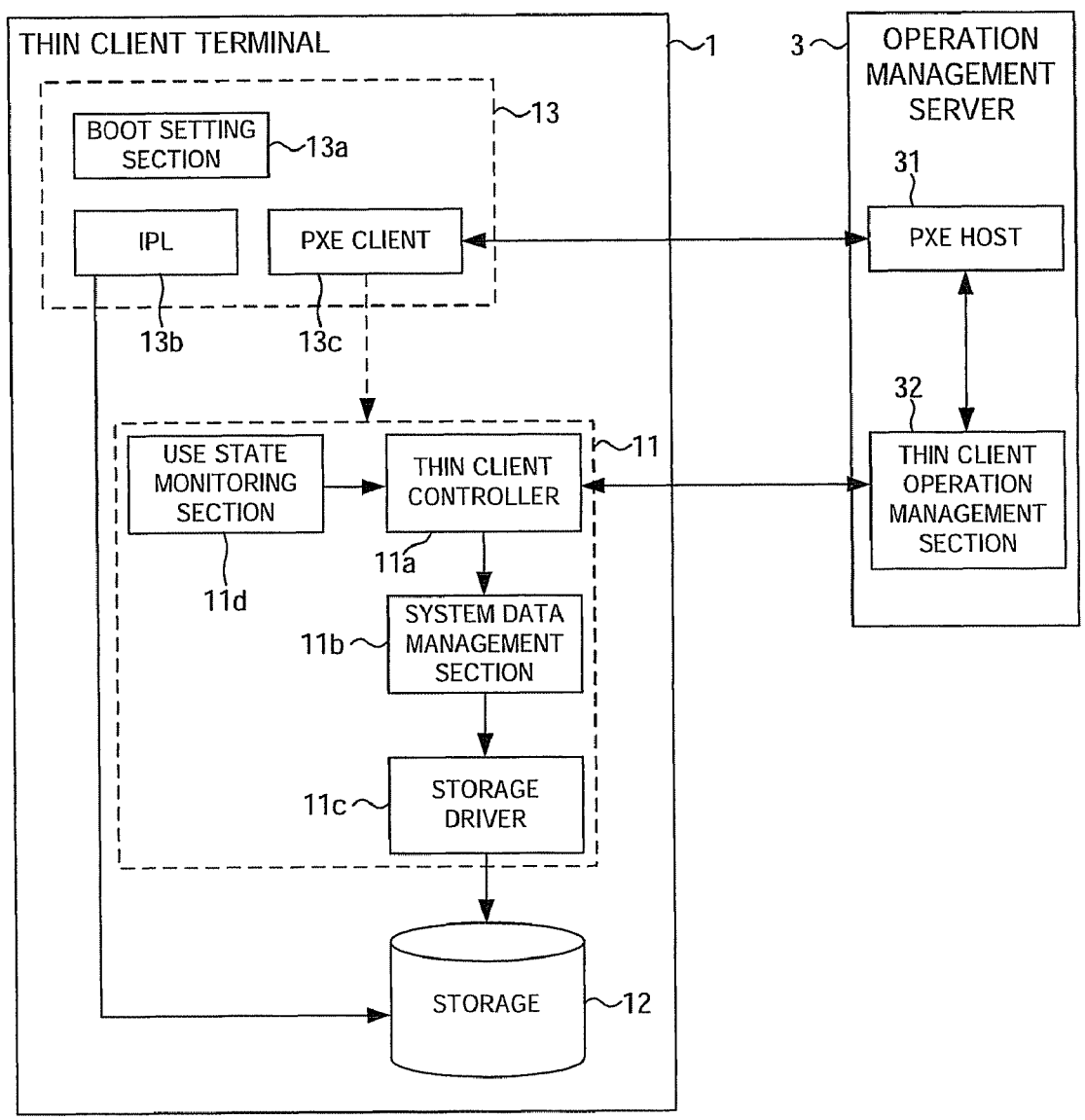
FIG. 12 is a block diagram showing the entire configuration of a second embodiment.

FIG. 12 is a view showing a configuration of a second embodiment. In FIG. 12, the same reference numerals as those in FIG. 1 denote the same or corresponding parts as those in FIG. 1, and the descriptions thereof will be omitted here.

The second embodiment differs from the first embodiment in that a use state monitoring section 11d is provided in the thin client terminal 1. The use state monitoring section 11d is started up at the boot time like the thin client controller 11a. The use state monitoring section 11d resides in the RAM and collects information concerning an operational state of the thin client terminal 1, such as a CPU utilization, a transmission/reception amount of packets therein, and operation state of an input device. When the value indicated in the above information becomes smaller than a threshold that has previously been set in the use state monitoring section 11d, the use state monitoring section 11d determines that the user infrequently access the thin client terminal 1 and instructs the thin client controller 11a to update the system data for mobile environment in that time. Upon receiving the instruction, the thin client controller 11a issues a data update instruction to the operation management server 3.

The use state monitoring section 11d may update the system data for mobile environment at a fixed time. When the operation management server changes the update execution time for each thin client terminal 1 at the network boot time, it is possible to prevent a load from being centralized onto the server side.

Since transfer of the system data for mobile environment is carried out in the background of a user's work, there may be case where a user shuts down the thin client terminal 1 during transfer or expansion of the system data for mobile environment. In order to prevent this, the use state monitoring section 11d issues an alarm to request a user to cancel the shut-down of the thin client terminal 1. Alternatively, the use state monitoring section 11d may forcibly cancel the shut-down of the thin client terminal 1 during the transfer and expansion of the system data for mobile environment.

Third Embodiment

Contrary to the case of the second embodiment, the update of the system data for mobile environment may be instructed by the operation management server 3 side. In this case, it is desirable that the operation management server 3 manages a state of the thin client terminal 1 so as not to cause unnecessary traffic and load due to execution of update of the system data for mobile environment for the thin client terminal 1 in a shut-down state.

Figure 13:
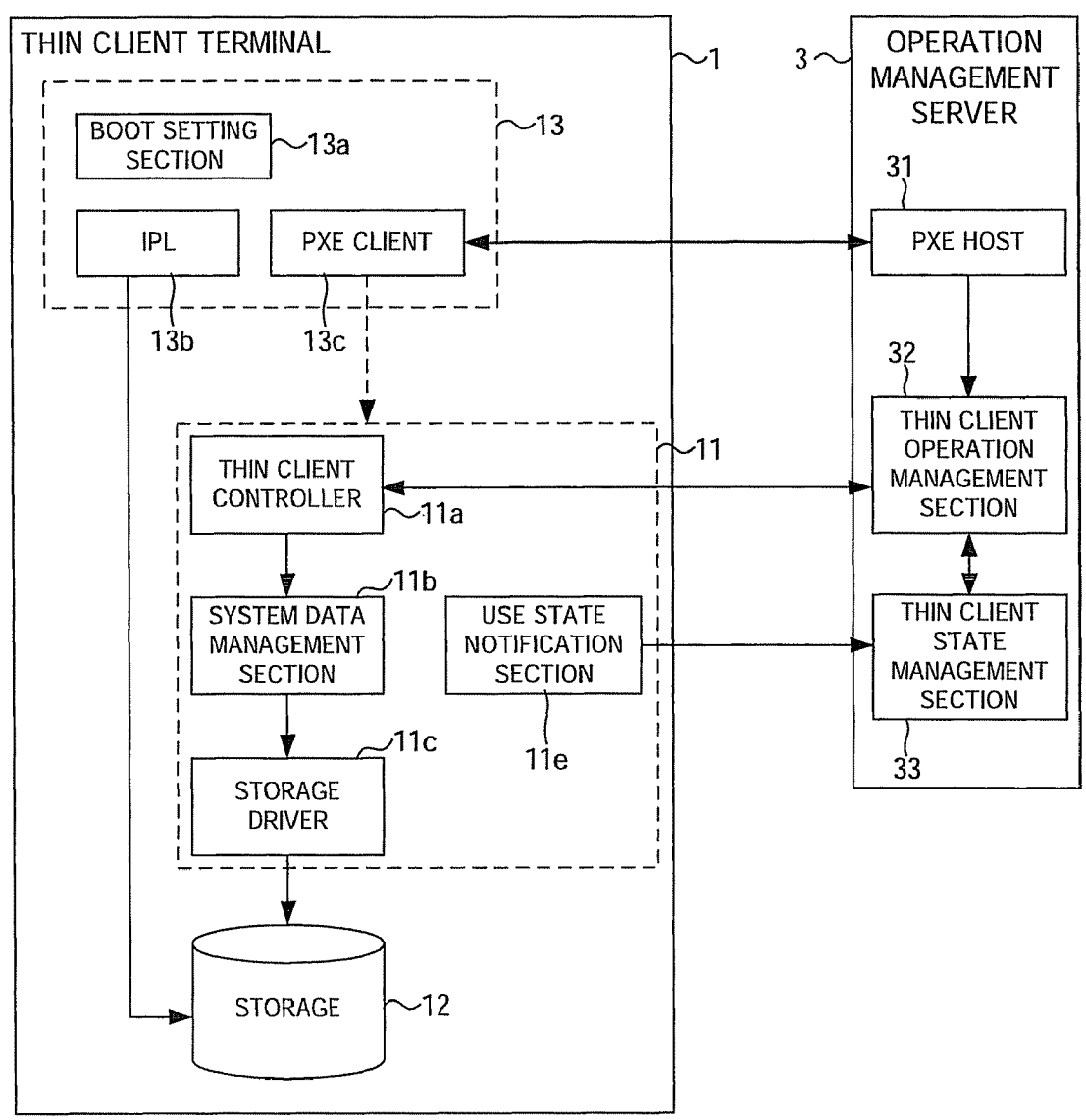
FIG. 13 is a block diagram showing the entire configuration of a third embodiment.

FIG. 13 is a view showing a configuration of the third embodiment. In FIG. 13, the same reference numerals as those in FIG. 1 denote the same or corresponding parts as those in FIG. 1, and the descriptions thereof will be omitted here.

The third embodiment differs from the second embodiment in that not the use state monitoring section 11d but a use state notification section 11e is provided in the thin client terminal 1 side and a thin client state management section 33 is provided in the operation management server 3 side.

As in the case of the thin client controller 11a, the thin client state notification section 11e is downloaded from the operation management server at the boot time and is then executed. Then, at the time when the boot is completed, the thin client state notification section 11e notifies the operation management server 3 of a state "open (operating state)" of the thin client terminal 1. Similarly, at the time when the thin client terminal 1 is shut down, the thin client state notification section 11e notifies the operation management server 3 of a state "closed (shut down state)" of the thin client terminal 1. The thin client state management section 33 of the operation management server 3 receives such information and retains it therein. FIG. 14 is a view showing an example of a table for managing the information. The table retains the following information.

IP address: IP address of thin client terminal 1

State: state of thin client terminal 1 ("open" or "closed")

State updated date: Date on which state is updated

Data update state: information indicating whether update of system data for mobile environment has been updated during operation of thin client terminal 1 (in the case where the data has been updated or where update is determined to be unnecessary, "done" is shown and, otherwise, "undone" is shown.)

Update execution date: Date on which system data for mobile environment has been updated (if updated)

Figure 15:
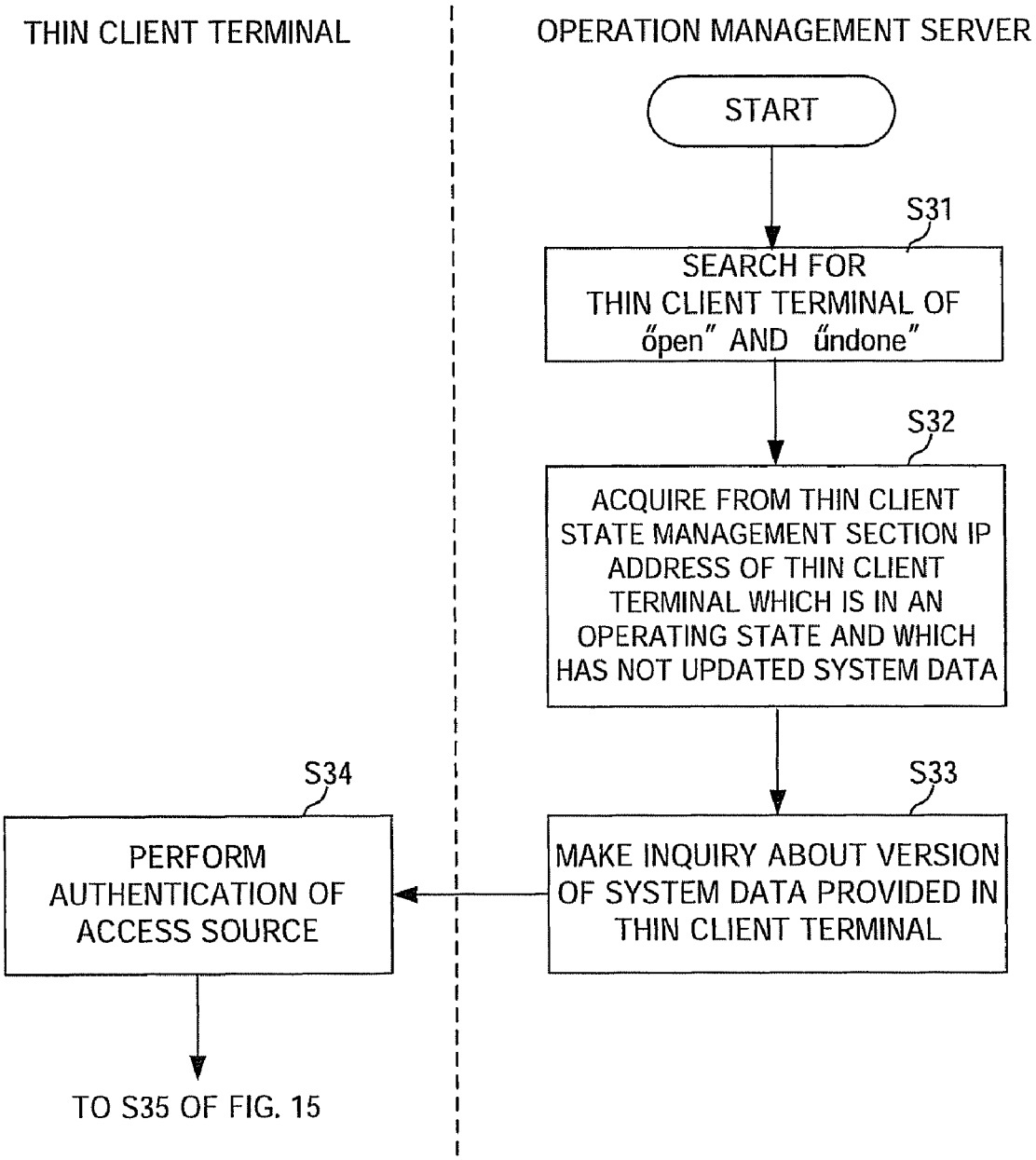
FIG. 15 is a first flowchart showing operation of the third embodiment.
Figure 16:
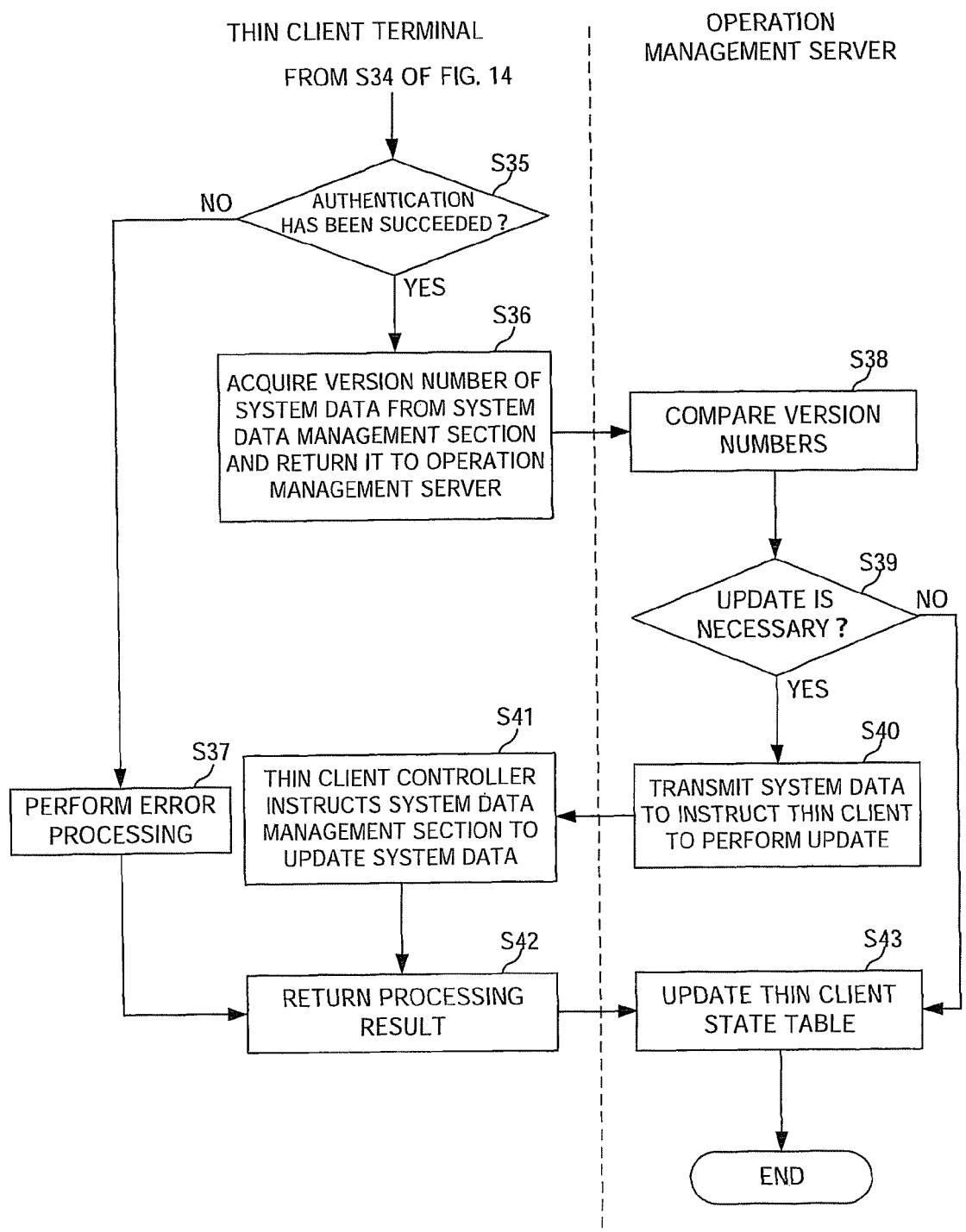
FIG. 16 is a second flowchart showing the operation of the third embodiment.
Figure 17:
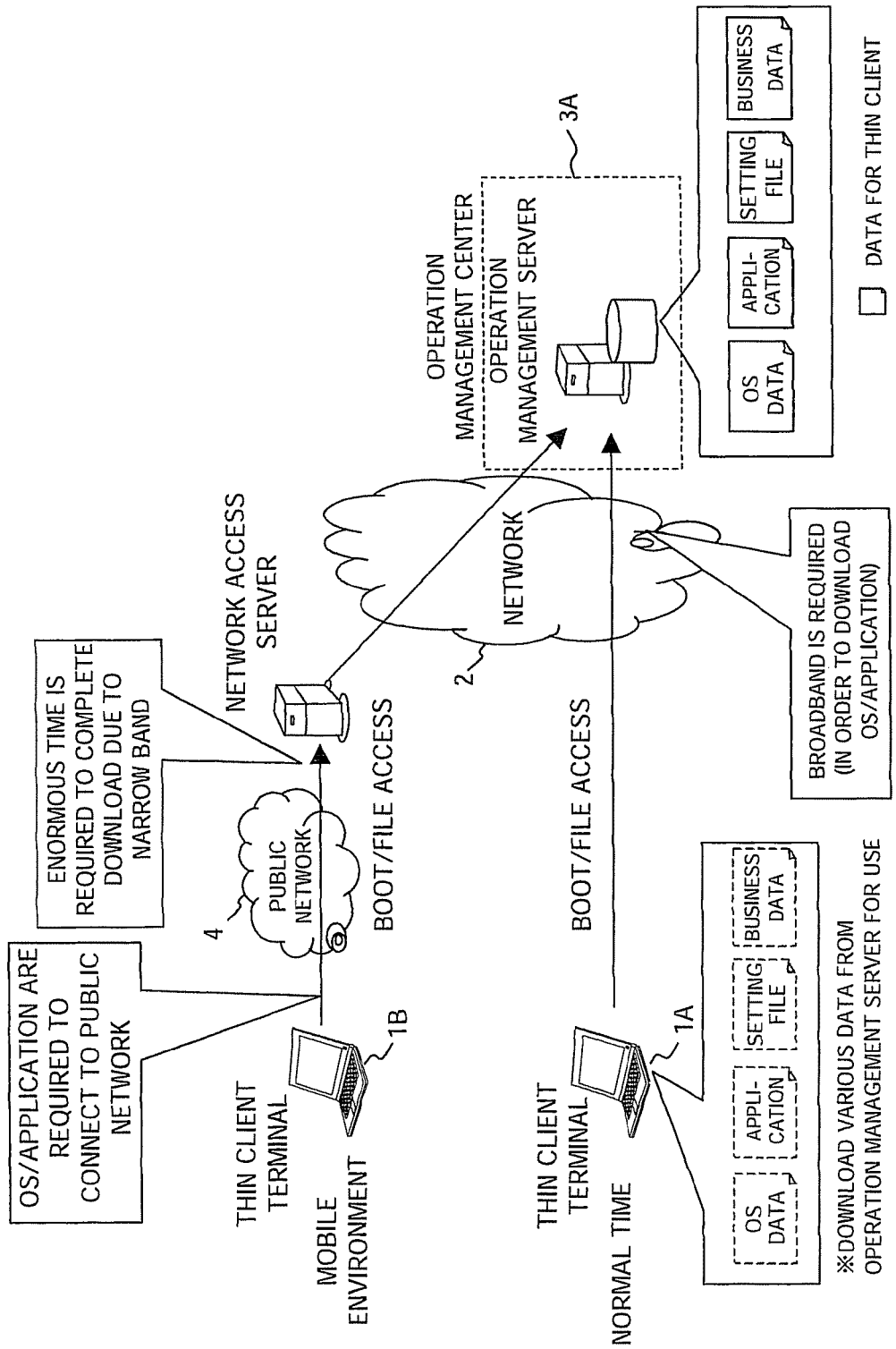
FIG. 17 is a view showing a conventional network boot thin client system.

Hereinafter, with reference to flowcharts shown in FIGS. 15 and 16, the system data for mobile environment update operation under the initiative of the operation management server 3 will be described.

The thin client operation management section 32 of the operation management server 3 refers to the thin client state management table in the thin client state management section 33 at regular time intervals and searches for a thin client terminal 1 whose state is "open" and delivery state is "undone" (S31).

The thin client operation management section 32 then acquires IP addresses of the thin client terminals 1 satisfying the above condition (S32) and makes an inquiry to the thin client controller 11a of each thin client terminal 1 about the version of the system data for mobile environment provided therein (S33). The thin client controller 11a that has received the inquiry from the thin client operation management section 32 performs authentication of an access source (S34).

The above authentication is performed using ID, password, certificate, IP address, or the like that the thin client terminal 1 has been acquired from the operation management server 3 at the boot time.

When the thin client controller 11a determines that the operation management server 3 is not a legitimate access source (NO in S35), the thin client controller 11a performs error processing (S37) and returns a result of the processing to the thin client operation management section 32 (S42). The thin client state management section 33 acquires the processing result from the thin client operation management section 32, updates the state updated date of the thin client state table (S43) and ends this flow.

On the other hand, the thin client controller 11a determines that the operation management server 3 is a legitimate access source (YES in S35), the thin client controller 11a acquires the version number of the system data for mobile environment from the system data management section 11b and returns it to the operation management server (S36).

The thin client operation management section 32 compares the version number of the system data for mobile environment acquired from the thin client controller 11a with the version number of the system data for mobile environment retained in the thin client operation management section 32 itself to determine whether the update is necessary (S39). When the thin client operation management section 32 determines that the update is unnecessary (NO in S39), the thin client state management section 33 acquires a result of the processing from the thin client operation management section 32, updates the data update state of the thin client state table to "done". The thin client state management section 33 further updates the state updated date and update execution date (S43) and ends this flow.

On the other hand, when the thin client operation management section 32 determines that the update is necessary (YES in S39), the thin client operation management section 32 transmits the system data for mobile environment to the thin client controller 11a and instructs the thin client controller 11a to perform update (S40). Upon receiving the system data for mobile environment, the thin client controller 11a instructs the system data management section 11b to update the system data for mobile environment. The system data management section 11b instructs the storage driver 11c to store the system data in the storage 12 together with the version number of the system data (S41).

Then, the thin client controller 11a returns a result of the processing to the thin client operation management section 32 (S42), and the thin client state management section 33 acquires the processing result from the thin client operation management section 32 and updates the data update state of the thin client state table to "done". The thin client state management section 33 further updates the state updated date and update execution date (S43) and ends this flow.

A thin client operation management server according to the present invention corresponds to the operation management server in the embodiments. A driver according to the present invention corresponds to the storage driver in the embodiments. A memory according to the present invention corresponds to the storage in the embodiments. A first management section according to the present invention corresponds to the PXE host in the embodiments. A second management section according to the present invention corresponds to the thin client operation management section in the embodiments. A controller generation section according to the present invention corresponds to the PXE client in the embodiments. A driver generation step according to the present invention corresponds to the processing of S15 in the embodiments. A write step according to the present invention corresponds to the processing of S28 in the embodiments. A use state notification step according to the present invention corresponds to the instruction issued from the thin client controller 11a which is based on the instruction from the use state monitoring section 11d in the second embodiment. A monitoring step according to the present invention corresponds to the operation of the use state monitoring section 11d in the second embodiment.

Further, it is possible to provide a program that allows a computer to execute the above operation shown in the flowcharts and respective steps of the embodiments as a thin client terminal operation program. By storing the above program in a computer-readable storage medium, it is possible to allow the computer to execute the program. The computer mentioned here includes a host device like a personal computer, a controller of a test device, a controller of a storage device, such as an MPU or CPU, and the like. The computer-readable medium mentioned here includes: a portable storage medium such as a CD-ROM, a flexible disk, a DVD disk, a magneto-optical disk, or an IC card; a database that holds computer program; another computer and database thereof; and a transmission medium on a network line.

As described above, according to the present invention, it is possible to provide a thin client system capable of simultaneously achieving a reduction in operation management cost and an improvement in security.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and, alterations could be made hereto without departing from the spirit and scope of the invention.

What is claimed is:

1. A non-transitory computer-readable medium having recorded thereon a thin client terminal operation program executed in a computer serving as a thin client terminal that can be connected to a thin client operation management server and has a memory capable of storing system data for mobile environment used when the thin client terminal is not connected to the thin client operation management server, the program allowing a computer to perform a process comprising:

causing a thin client controller to generate a driver capable of accessing the memory; and
   causing the driver generated by the thin client controller to write the system data for mobile environment acquired from the thin client operation management server in the memory, wherein:
   the thin client controller is generated by system data for non-mobile environment acquired from the thin client operation management server at the time when the thin client terminal is connected to the thin client operation management server;
   the thin client controller manages the system data for mobile environment stored in the memory after the generation of the driver and generates a system data management section that instructs, based on a result of a management by the thin client controller, the driver to write the system data for mobile environment acquired from the thin client operation management server in the memory; and
   the thin client controller generates first authentication information when generating the system data management section and uses the first authentication information to access the system data management section.

2. The computer-readable medium according to claim 1, wherein the system data management section generates second authentication information when generating the driver and uses the second authentication information to access the driver.

3. The computer-readable medium according to claim 1, wherein the system data management section manages a version number of the system data for mobile environment stored in the memory.

4. The computer-readable medium according to claim 1, wherein the process further comprises:
   monitoring a use state of the thin client terminal; and
   the thin client controller acquires the system data for mobile environment from the thin client operation management server at a timing indicated by a result of the monitoring.

5. The computer-readable medium according to claim 1, wherein the process further comprises:
   monitoring a use state of the thin client terminal; and
   notifying the thin client operation management server of a monitoring result of the monitoring, and
   wherein the thin client controller acquires the system data for mobile environment from the thin client operation management server at a predetermined timing determined by the thin client operation management server based on a notification result of the notifying.

6. A thin client terminal that can be connected to a thin client operation management server, comprising:
   a memory capable of storing system data for mobile environment used when the thin client terminal is not connected to the thin client operation management server; and
   a controller generation section that acquires the system data for non-mobile environment from the thin client operation management server at the time when the thin client terminal is connected to the thin client operation management server and uses the system data for non-mobile environment to generate a thin client controller, generates a driver capable of accessing the memory by the operation of the thin client controller, and uses the driver to write the system data for mobile environment acquired from the thin client operation management server in the memory; wherein:
   the thin client controller manages the system data for mobile environment stored in the memory after the generation of the driver and generates a system data management section that instructs, based on a result of a management by the thin client controller, the driver to write the system data for mobile environment acquired from the thin client operation management server in the memory; and
   the thin client controller generates first authentication information when generating the system data management section and uses the first authentication information to access the system data management section.

7. The thin client terminal according to claim 6, wherein the system data management section generates second authentication information when generating the driver and uses the second authentication information to access the driver.

8. The thin client terminal according to claim 6, wherein the system data management section manages a version number of the system data for mobile environment stored in the memory.

9. The thin client terminal according to claim 6, comprising a use state monitoring section that monitors a use state of the thin client terminal, wherein
   the thin client controller acquires the system data for mobile environment from the thin client operation management server at a timing indicated by a result of the monitoring of the use state monitoring section.

10. The thin client terminal according to claim 6, comprising a use state notification section that monitors a use state of the thin client terminal and notifies the thin client operation management server of a monitoring result, wherein
the thin client controller acquires the system data for mobile environment from the thin client operation management server at a predetermined timing determined by the thin client operation management server based on a notification result of the use state notification section.

11. An operation method for a thin client terminal that can be connected to a thin client operation management server and has a memory capable of storing system data for mobile environment used when the thin client terminal is not connected to the thin client operation management sewer, the method comprising:
causing a thin client controller to generate a driver capable of accessing the memory; and
causing the driver generated by the thin client controller to write the system data for mobile environment acquired from the thin client operation management server in the memory, wherein:
the thin client controller being generated by system data for non-mobile environment acquired from the thin client operation management server at the time when the thin client terminal is connected to the thin client operation management server;
the thin client controller manages the system data for mobile environment stored in the memory after the generation of the driver and generates a system data management section that instructs, based on a result of a management by the thin client controller, the driver to write the system data for mobile environment acquired from the thin client operation management server in the memory; and
the system data management section manages a version number of the system data for mobile environment stored in the memory.

12. The operation method according to claim 11, further comprising:
monitoring a use state of the thin client terminal, wherein
the thin client controller acquires the system data for mobile environment from the thin client operation management server at a timing indicated by a result of the monitoring.

13. The operation method according to claim 11, further comprising:
monitoring a use state of the thin client terminal; and
notifying the thin client operation management server of a monitoring result of monitoring,
wherein the thin client controller acquires the system data for mobile environment from the thin client operation management server at a predetermined timing determined by the thin client operation management server based on a notification result of notifying.

* * * * *

UNITED STATES PATENT AND TRADEMARK OFFICE
CERTIFICATE OF CORRECTION

PATENT NO. : 8,281,038 B2
APPLICATION NO. : 12/503473
DATED : October 2, 2012
INVENTOR(S) : Takeshi Ohtani Page 1 of 1

It is certified that error appears in the above-identified patent and that said Letters Patent is hereby corrected as shown below:

Column 13, Line 12, In Claim 11, delete "sewer," and insert -- server, --, therefor.

Signed and Sealed this
Eighteenth Day of December, 2012

David J. Kappos
*Director of the United States Patent and Trademark Office*